United States Patent [19]

Peterson

[11] 4,310,336
[45] Jan. 12, 1982

[54] FILTER BAG ATTACHMENT

[75] Inventor: Harley G. Peterson, La Crescenta, Calif.

[73] Assignee: Joy Manufacturing Company, Pittsburgh, Pa.

[21] Appl. No.: 124,181

[22] Filed: Feb. 25, 1980

[51] Int. Cl.³ ............................................. B01D 46/02
[52] U.S. Cl. ................................ 55/377; 55/341 NT; 55/378; 55/509
[58] Field of Search ................................. 55/374–378, 55/341 NT, 509

[56] References Cited

U.S. PATENT DOCUMENTS

| Re. 18,822 | 5/1933  | Paine           |          |
|------------|---------|-----------------|----------|
| 2,010,898  | 8/1935  | Ruemelin        |          |
| 2,299,623  | 10/1942 | Harper          | 55/341 NT X |
| 2,308,309  | 1/1943  | Ruemelin et al. |          |
| 2,308,310  | 1/1943  | Ruemelin, Jr. et al. |     |
| 2,576,310  | 11/1951 | Ruemelin        |          |
| 2,885,028  | 5/1959  | Sylvan          |          |
| 3,170,777  | 2/1965  | Held            | 55/374 X |
| 3,177,636  | 4/1965  | Uensen          | 55/341 NT |
| 3,747,305  | 7/1973  | O'Dell et al.   | 55/378 X |
| 3,937,621  | 2/1976  | Gravley         | 55/377   |
| 3,997,305  | 12/1976 | Ulvestad et al. | 55/379 X |
| 4,003,727  | 1/1977  | O'Dell          | 55/377   |
| 4,015,961  | 4/1977  | Howard et al.   | 55/378   |
| 4,042,356  | 8/1977  | Miller          | 55/379 X |
| 4,089,664  | 5/1978  | Noland          | 55/374 X |
| 4,157,901  | 6/1979  | Schaltenbrand   | 55/379 X |
| 4,194,894  | 3/1980  | Noland          | 55/379   |
| 4,220,459  | 9/1980  | Hammond et al.  | 55/377 X |
| 4,266,954  | 5/1981  | Oare et al.     | 55/377 X |

FOREIGN PATENT DOCUMENTS 183946 9/1906 Fed. Rep. of Germany.

Primary Examiner—Kathleen J. Prunner

[57] ABSTRACT

A split spring steel ring having a channel-shape cross-sectional configuration is sewn into the bottom cuff of a filter bag. The split ring is placed into the opening in the thimble plate of a plenum chamber by lapping the ring at the split and pushing inward until the diameter is reduced for insertion into the opening. The ring is then allowed to expand until the ends abutt at the split. The ring is maintained in its expanded condition in interlocking engagement with the opening by a thimble extension which extends through the ring below the thimble plate of the plenum chamber.

6 Claims, 6 Drawing Figures

FILTER BAG ATTACHMENT

CROSS REFERENCE TO RELATED APPLICATION

Reference is hereby made to the following co-pending U.S. application dealing with related subject matter and assigned to the assignee of the present invention: "FILTER BAG RETAINING SYSTEM WITH REMOVABLE THIMBLE EXTENSION" by Harley G. Peterson, U.S. Ser. No. 27,181, filed Apr. 4, 1979, now U.S. Pat. No. 4,219,343 issued Aug. 26, 1980.

BACKGROUND OF THE INVENTION

1. Field of the Invention

The present invention relates to gas separation apparatus, and, more particularly, to an attachment arrangement for releasably connecting the end of a filter bag to an apertured plate member.

2. Description of the Prior Art

While not necessarily limited thereto, the present invention is particularly adapted for use in a baghouse of the type in which dust-laden air enters a plenum chamber and then flows upwardly through apertures or openings in an upper wall of the plenum chamber into a plurality of vertically elongated tubular filter bags which separate the dust from the air as it flows through the fabric walls of the bags. The bottom end of the filter bags are open and are connected to the top wall of the plenum chamber in flow-through communication with the openings.

There are several ways in which the filter bags have been connected or attached to the plenum wall. One commonly used method is where a cylindrical thimble of relatively thin-qauge material is secured in each opening with one end of the thimble being rolled onto the lip or peripheral edge of the opening and with the body of the thimble projecting upwardly from the plenum plate wall. The open end of the bag fits down onto the outer surface of the thimble body and is held thereto by a clamping member passing around the outside of the bag such as illustrated in U.S. Pat. No. 2,010,898 or by an expandable spring-like ring or band as shown in U.S. Pat. No. 4,003,727.

Another form of bag attachment, similiar to the above, is where a solid spring-like band having a larger diameter than the inside diameter of the thimble is sewn into the bottom cuff of the bag. In such case, the spring is deformed to allow the lower end of the bag to be inserted into the thimble, and then, as the spring band is released it resumes its original circular shape and forms an abutting engagement with an internal rib flange portion on the thimble. Examples of such attachment arrangements are shown in U.S. Pat. Nos. Re18,822; 3,937,621 and 4,042,356.

Still another form of filter bag attachments are those that eliminate the use of thimbles wherein the lower end of the bag is attached directly to the top wall of the plenum chamber. Generally, such attachments are accomplished by incorporating a spring-like hoop (U.S. Pat. No. 2,576,310) or a pair of axially spaced hoops (U.S. Pat. No. 2,308,309) in the lower end of the filter bag, the hoop in its expanded state having a larger diameter than the diameter of the opening in the plenum wall. The hoop is deformed and passed through the opening and then expands abutting the lower marginal edge of the opening, or, as in the case of the two hoops, the marginal edge of the opening is confined between the two hoops. A somewhat similar arrangement is seen in U.S. Pat. No. 2,308,310 wherein a rubber collar is affixed to the end of the bag. The collar is of a diameter greater than that of the opening and has a pair of, axially spaced, molded peripheral ribs defining a groove therebetween. The collar is deformed to be inserted into the opening whereby upon returning to its original shape, the edge of the plenum wall surrounding the opening is seated in the groove and confined between the rib members. Another similar arrangement is shown in U.S. Pat. No. 3,747,305 which describes the use of a flat resilient collar band having a soft resilient collar surroundingly engaging the outer face of the band. The collar has its ends folded upon itself to provide a cross-sectional channel-like configuration with ridges at its outer edges and a groove therebetween. The band and collar assembly are interconnected at the end of the bag. The diameter of the band and collar assembly are arranged with relation to the opening in the apertured plate so that the opening will snugly fit in the groove in the center of the channel-like configuration. The folded over sections of the collar provide holding ridges for securing the filter bag against the opening. U.S. Pat. No. 4,015,961 is basically an attachment mechanism for connecting two filter bags together although it can also be used for connecting the end of a filter bag to an apertured plate wall. Disclosed is an annular thin wall band made of metallic spring steel with the ends overlapping and fastened together by rivets, thereby forming a circular band. The band includes a plurality of discrete, peripherally spaced, stamped-out resilient tabs which extend outwardly from an outside surface of the band. A flexible collar is then assembled directly across the outer surface of the band such that it substantially conforms to the shape of the tabs and is secured thereto by an adhesive material. The flexible collar is made of felt or rubber-type material and when secured to the band, there exists a pair of outer peripheral ridges forming a center groove or recess therebetween. The band and collar assembly are then secured to the end of the filter bag. For connection of the bag to the plenum plate wall, the end of the filter bag is pushed through the aperture so that the wall of the aperture is positioned in the groove between the ridges. The opening of the aperture is approximately the same as the outer diameter of the recessed section to provide a snug fit when the filter bag is assembled in the aperture. The outer diameter of the ridges is greater than the plate opening. Because of the resiliency of the band, and additionally, the resiliency of the protrusions, as the end of the bag is passed into the aperture in the plate, the band is bent inwardly to permit easy insertion into the aperture. The spaced apart ridges hold the filter bag in a secure arrangement within the apertured plate.

Although some of the above-described bag attaching mechanisms have certain advantages over other ones listed, none of these prior art mechanisms are as simple in design and construction, as well as, ecconomical in manufacture and erection as desired in the industry. Furthermore, not all of these mechanisms provide a sufficient seal to prevent leakage of the dirty gas from the bag attaching means.

It has also been recognized by those skilled in gas filtering apparatus that in certain applications it is advantageous to utilize thimble extensions or annular inserts that extend down into the dirty gas chamber, below the thimble plate of the plenum chamber. These thimble extensions are primarily used for prolonging the useful life of a filter bag by preventing wear to the lower end of the bag which is attached to the plenum chamber. The thimble extension alleviates the incidence of air entering the thimble in a sideways or radial direction and causes the entire cross section of the air stream, when it intersects the bottom of the bag, to be essentially parallel to the longitudinal axis of the bag, thereby decreasing bag wear due to the particles in the gas stream striking against the filter bag fabric. In the past, thimble extensions have normally comprised an integral part of the thimble itself such as shown in U.S. Pat. No. 2,885,028 and also as seen in German Pat. No. 183,946. Additionally, my above-referenced copending application is specifically directed to a removeable thimble extension which is an advancement over the art.

Up to now, filter bag attaching mechanisms have been separate devices directed solely to that function; whereas, thimble extensions have been separate devices directed to the above described function, separate from the function of the attaching mechanism.

SUMMARY OF THE INVENTION

Accordingly, one of the principal objects of the present invention is to provide a filter bag with an improved coupling arrangement for interconnection to an opening in a plenum chamber wall and which additionally functions as a thimble extension.

Another object of the present invention is to provide a filter bag having an improved coupling arrangement which provides easy removal and replaceability of the filter bag, and, at the same time, holds the bag in a fixed position during the filtering operation.

Yet another object of the present invention is to provide a filter bag with a coupling arrangement which is easy to manufacture, simple to manipulate, and effective in its operation.

A still further object of the present invention is to provide a filter bag with an improved coupling arrangement which provides a sufficient seal in preventing gas leakage.

In furtherance of these and other objects, the present invention sets forth an improved filter bag attaching means for attaching one end of a filter bag to the peripheral edge of an opening defined in the upper plate wall of a plenum chamber. More particularly, the improved attaching means includes annular means having a configuration for interlocking engagement with the peripheral edge of the opening. Preferably, the annular means is in the form of a split ring which is adapted to be collapsed to a diameter less than that of the opening and which takes the cross-sectional shape of an outwardly facing channel thereby forming peripheral, axially spaced, flange portions and a groove or recess section therebetween. When the split ring is in its expanded condition, the diameter of the flange portions is larger than that of the opening whereas the diameter of the recess section is less than that of the opening.

The improved attaching means further includes a tubular insert having a first portion with a diameter less than the inside diameter of the split ring for insertion into same and a second portion with a diameter greater than that of the first portion to thereby prevent the tubular insert from passing completely through the split ring. The first portion of the tubular insert prevents the split ring from collapsing and maintains it in its interlocking engagement with the peripheral edge of the opening thereby providing releasable connection of one end of the filter bag to the plenum plate member.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like numerals appear on serveral drawings to identify the same components. Also, in the following description, it is to be understood that such terms as "forward", "rearward", "left", "right", "upwardly", "downwardly" and the like, are words of convenience and are not to be construed as limiting terms.

IN GENERAL

Figure 1:
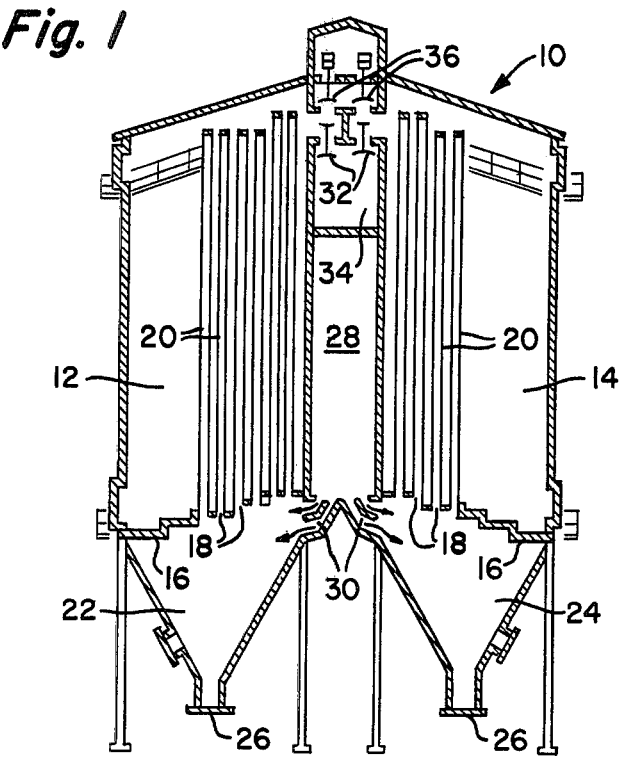
FIG. 1 is a schematic cross-sectional view of a baghouse incorporating the improved filter bag attaching means.

Referring now to the drawings, and particularly FIG. 1, there is shown a schematic view of a baghouse of well known construction, being indicated generally by the numeral 10, which incorporates a preferred embodiment of the invention. The baghouse 10 includes a pair of gas-filtering chambers 12 and 14, each being provided with a lower, stepped bottom wall 16. Formed in each bottom wall 16 is a plurality of openings or apertures 18 to which are releasably connected the lower end of a plurality of filter bags 20. As conventional, each of the chambers 12, 14 houses several bags 20. Beneath each of the walls 16 is a hopper 22 or 24 which collects particulate materials separated from the entering gas stream and is provided at its lower end with a discharge opening 26.

During a gas-filtering operation, dust laden air enters the baghouse 10 through a gas inlet chamber 28 and then passes through openings 30 into the respective ones of hoppers 22 and 24. In the hopper, the gas stream reverses its direction of movement and flows upwardly through opening 18 and through the filter bags 20. Each of the filter bags 20 is formed from a porous fabric material which permits the gas to pass therethrough while retaining the particulate material on the inner surface of the filter. After passing through the bag filters 20, the gas then flows through valves 32 to a gas outlet chamber 34. By manipulating the valves 32, as well as valves 36, the direction of the airflow through the chambers 12 and 14 can be reversed, whereby the dust adhering to the inner periphery of each of the filter bags 20 can be blown downwardly into the hoppers 22 and 24.

Figure 2:
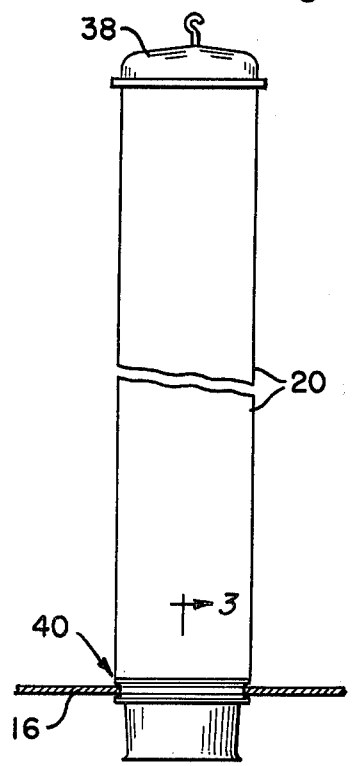
FIG. 2 is an illustration of one of the filter bags used in the baghouse of FIG. 1, showing its connection to the top wall of the plenum chamber.

The manner in which each filter bag 20 is suspended within an associated one of the chambers 12 or 14 is shown in FIG. 2. At the top, each bag is secured around its periphery to a bell-shaped cap 38 connected through a stainless steel tensioning device (not shown), to an upper support member within the baghouse 10. The lower end of the filter bag 20 is releasably connected to the apertured lower wall member 16 and is in flow-through communication with openings 18, by the improved attaching means 40 which will now be discussed in further detail.

IMPROVED FILTER BAG ATTACHING MEANS

Figure 3:
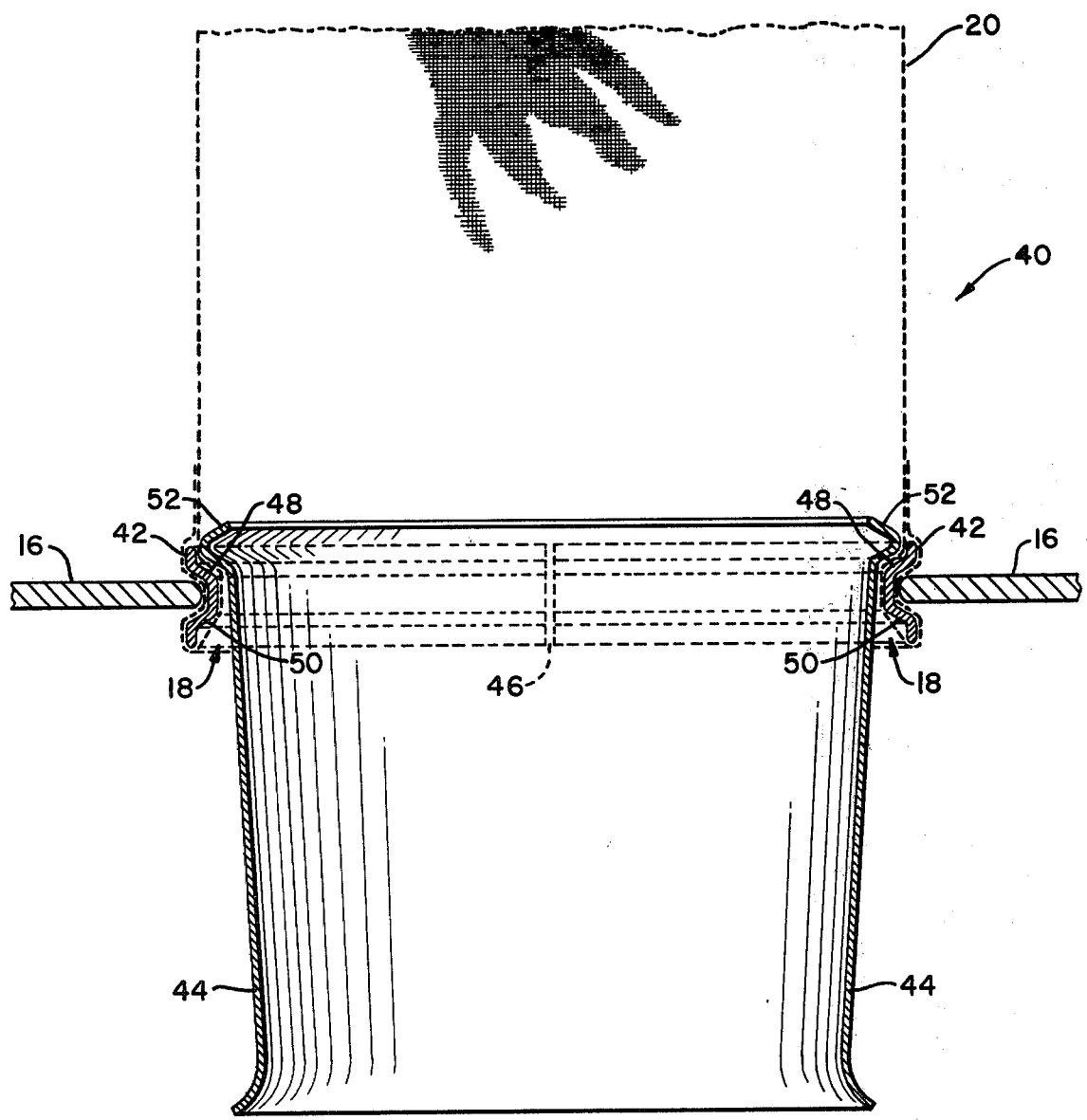
FIG. 3 is an enlarged cross-sectional view, taken along lines 3—3 of FIG. 2, of the lower end of the filter bag being connected to the top wall of the plenum chamber with the split ring in interlocking engagement with the peripheral edge of the opening and with the tubular insert positioned within the split ring for maintaining same in its interlocking position.

As best seen in FIG. 3, the bag attaching means 40 includes annular means, preferably in the form of a split ring 42, and a tubular insert or thimble extension 44. As used herein, a split ring is defined as a generally circular ring or band that is noncontinuous, having separate ends. The split-ring 42 having split 46 is confined within a cuff sewn within the lower end of the filter bag 20, the cuff being formed by folding the fabric material back upon itself and then stitching the same in a manner that would be readily understood to those skilled in the art.

The split ring 42 is of a resilient material, preferably being formed from spring steel in an outwardly facing channel-shaped configuration. In cross-section, the ring 42 includes a central annular section with integrally connected upper and lower outwardly projecting respective flange portions 48, 50 (FIG. 3). The upper flange portion 48 extends upwardly and outwardly a short distance from the top edge of the central section and then extends upwardly a short distance, being generally parallel to the central section while the lower flange portion 50 extends downwardly and outwardly a short distance from the lower edge of the central section and then extends downwardly a short distance, being generally parallel to the central section. As can be seen in FIG. 2, the axially spaced upper and lower peripheral flange portions 48, 50 define a groove or recess portion therebetween which is of a breath slightly greater than the thickness of the plenum wall member 16. Additionally, it should be pointed out that the diameter of the peripheral flange portions, when the split ring 42 is in its relaxed mode (FIG. 4), is greater than the diameter of the opening 18, whereas, the diameter of the annular section is slightly less than the diameter of the opening 18. Thus, when the ring 42 is inserted into the opening 18, the inner edge of the opening 18 abuts the outer surface of the central section and the flange portions or peripheral ribs 48, 50 confine or trap the peripheral or marginal edge of the opening within the recess of the ring 42 whereby the split ring and bag therewith are interlockingly engaged to the plenum wall 16.

The insert or extension 44 comprises a tubular member formed of relatively thin sheet metal and has at its upper portion a peripheral flange or rib 52 with an inclined section that is of such diameter so as to rest on the inclined portion of the upper flange 48 of ring 42. The diameter of the rib portion 52 is slightly greater than the diameter of opening 18 so as to prevent the extension 44 from dropping or passing completely through opening 18. The lower portion of the extension 44 is of a diameter slightly less than the diameter of the opening 18 for passage therethrough of the extension. The walls of the lower portion of the extension 44 taper inwardly from the upper portion toward the lower portion and to the lower end of the extension which is flared outwardly. As can be appreciated, the tapering of the walls of the extension 44 facilitates insertion of the extension 44 into the opening 18.

Figure 4:
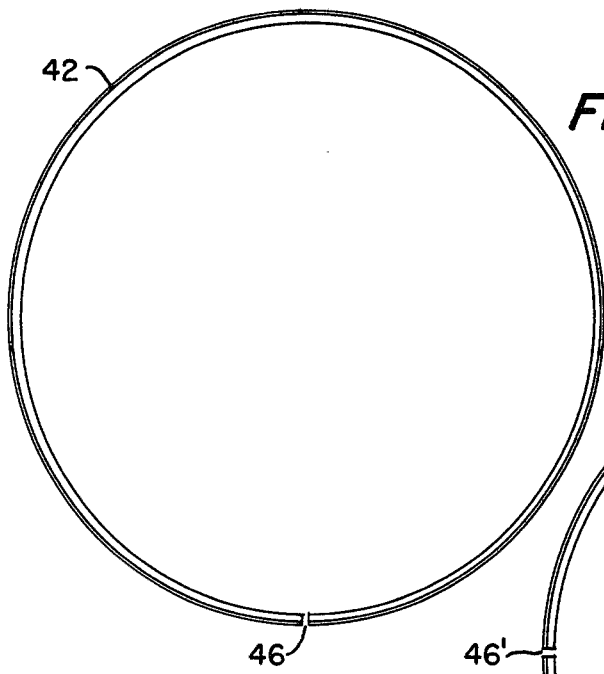
FIG. 4 is a plan view of the split ring removed from the bag with the ends of the split ring abutting in its relaxed mode.
Figure 4A:
FIG. 4A is a partial sectional view, on a somewhat enlarged scale, of the split ring seen in FIG. 4 in its collapsed mode with the ends overlapping so that the split ring can be inserted into the thimble plate.

Releasably connecting the filter bag 20 to the plenum plate member 16 is a relatively simple operation. Once the split ring 42 is inserted into the cuff of the bag, the insert extension 44 is inserted up into the bag 20 by slightly expanding the ring 42 to permit clearance therethrough. The split ring 42 is then placed into the opening 18 by lapping the ring at the split 46 (see FIG. 4A) and pushing inward until the diameter reduces enough to be inserted into the opening 18. As the ring 42 returns to its normal relaxed mode the ends thereof butt at the split (FIG. 4). In such relaxed mode, the marginal edge portion of the opening 18 is trapped between the flanges 48, 50, thus preventing axial movement of the ring and thereby providing for interlocking engagement of the lower end of the bag with the plenum plate member 16. To maintain the split ring 42 in its interlocking engagement, the extension 44 is dropped or lowered down through the ring wherein the upper peripherial rib portion rests on the inclined surface of the upper flange 48, thus, preventing the extension from completely passing through the ring and prohibiting the ring from collapsing in diameter. Depending on the relative diameter of the ring and the extension, in such seated position, the ring may be in its relaxed condition, or, could possibly be slightly expanded. In any circumstances, such abutting relationship of the extension 44 and ring 42 creates a relatively tight seal thereby preventing gas leakage about the connection.

For disconnecting the filter bag 20 from the plate member 16, the reverse operation is performed; ie. the extension is pushed up into the bag and then the split ring is collapsed to permit passage through the opening 18.

In addition to maintaining the split ring 42 in its interlocking engagement position with the opening 18, the extension 44 channels the flow of the incoming gas stream. Due to the extension 44 extending below the floor plate member 16, the gas flowing along the underside of the floor must now flow downwardly and then upwardly through the extension 44. Thus, the particulate material entrained within the air stream will not strike the fabric bag filter and cause excessive wear thereto, but rather, will impinge on the sides of the extension 44. The extension, being formed from metal, will not experience any deleterious effects.

Figure 5:
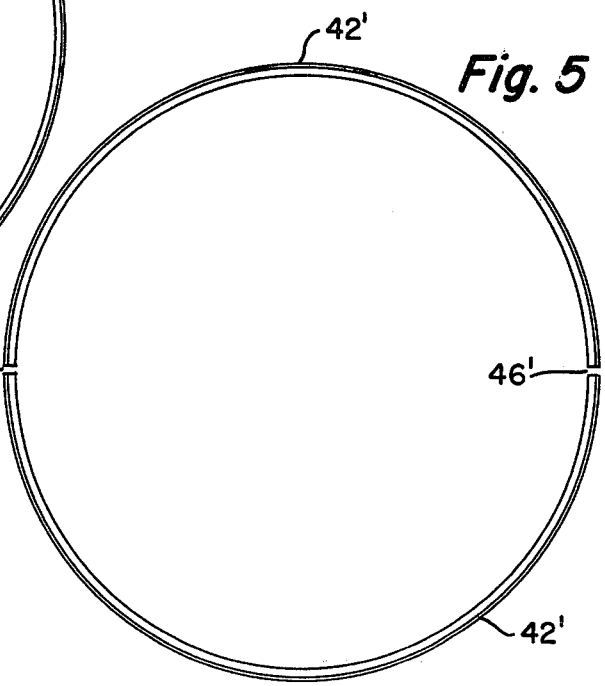
FIG. 5 is a plan view of a modified form of the annular means, being shown as two-semi cylindrical rings.

In FIG. 5, an alternative embodiment of the annular means which makes up the improved attaching means 40 is shown. The annular means here is represented by a pair of semi-circular rings 42', each being formed in a channel-like configuration similar to the split ring 42. As can be easily understood, the rings 42' are confined within the cuff of the filter bag 20 in a similar manner. The operation of the extension is the same. When semi-circular rings 42' and extension 44 are assembled within an aperture 18 the adjacent ends of the rings will be spaced from each other by gaps 46'. It should also be pointed out here that the annular means can include several circular ring segments.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred exemplary embodiment thereof.

What is claimed is:

1. In a baghouse arrangement for filtering particulate matter from a gaseous stream including at least one plenum having a plate member provided with at least one opening defined by a peripheral edge for gas passage therethrough and at least one tubular filter bag with one of its ends for connection to said peripheral edge in flow-through communication with said plenum, the improvement comprising in combination:
    (a) a split ring attached to said one end of said filter bag and adapted to be inserted into the opening of said plenum plate member; and
    (b) a removable elongated rigid insert tube adapted to be inserted into said one end of said filter bag and into said ring;
    (c) said insert tube having an upper peripheral rib portion of a diameter greater than the diameter of said opening such that when said ring is placed within said opening said insert tube is fitted through said ring with the lower portion of said insert tube extending below said plate member and the upper peripheral rib portion being in abutting relationship with said split ring to thereby maintain same in engagement with said peripheral edge of said opening whereby said filter bag is releasably connected to said plenum plate member.

2. A baghouse arrangement as set forth in claim 1 wherein said split ring is resilient so as to be adapted to be reduced to a diameter less than the diameter of said opening.

3. A baghouse arrangement as set forth in claim 2 wherein said split ring has a substantially uniform cross-sectional shape of a peripherally outwardly facing channel.

4. A baghouse arrangement as set forth in claim 3 wherein said split ring comprises at least two substantially identical semi-cylindrical ring segments forming an annular ring, said ring segments forming said cross-sectional channel including axially spaced apart flange portions and a groove therebetween of a breadth slightly grester than the thickness of said plenum plate member.

5. A baghouse arrangement as set forth in claim 1 wherein said split ring is spring steel.

6. A baghouse arrangement as set forth in claim 1 wherein said insert tube is formed of sheet metal.

* * * * *

UNITED STATES PATENT AND TRADEMARK OFFICE
CERTIFICATE OF CORRECTION

PATENT NO. : 4,310,336
DATED : January 12, 1982
INVENTOR(S) : Harley G. Peterson It is certified that error appears in the above-identified patent and that said Letters Patent are hereby corrected as shown below:

Column 3, line 54 before the word "peripheral" insert --two--.

Column 5, line 49 change "2" to --3--.

Claim 4, line 24, change "grester" to --greater--.

Signed and Sealed this

Twenty-fifth Day of May 1982

[SEAL]

Attest:

*Attesting Officer*

GERALD J. MOSSINGHOFF

*Commissioner of Patents and Trademarks*